Oct. 1, 1963 K. M. SANO ETAL 3,105,903
APPARATUS FOR UNLOADING FILM SHEET CASSETTES
Filed July 29, 1960 4 Sheets-Sheet 1

INVENTORS
KAREL MARCEL SANO
AND FREDERIK J. VAN LANDEGHEM

BY John J. Dennemeyer

ATTORNEY

Oct. 1, 1963 K. M. SANO ETAL 3,105,903
APPARATUS FOR UNLOADING FILM SHEET CASSETTES
Filed July 29, 1960 4 Sheets-Sheet 2

INVENTORS
KAREL MARCEL SANO
AND FREDERIK J. VANLANDEGHEM

BY John J. Dennemeyer

ATTORNEY

Oct. 1, 1963     K. M. SANO ETAL     3,105,903
APPARATUS FOR UNLOADING FILM SHEET CASSETTES
Filed July 29, 1960     4 Sheets-Sheet 3

INVENTORS
KAREL MARCEL SANO
AND FREDERIK J. VAN LANDEGHEM

BY *John J. Dennemeyer*

ATTORNEY

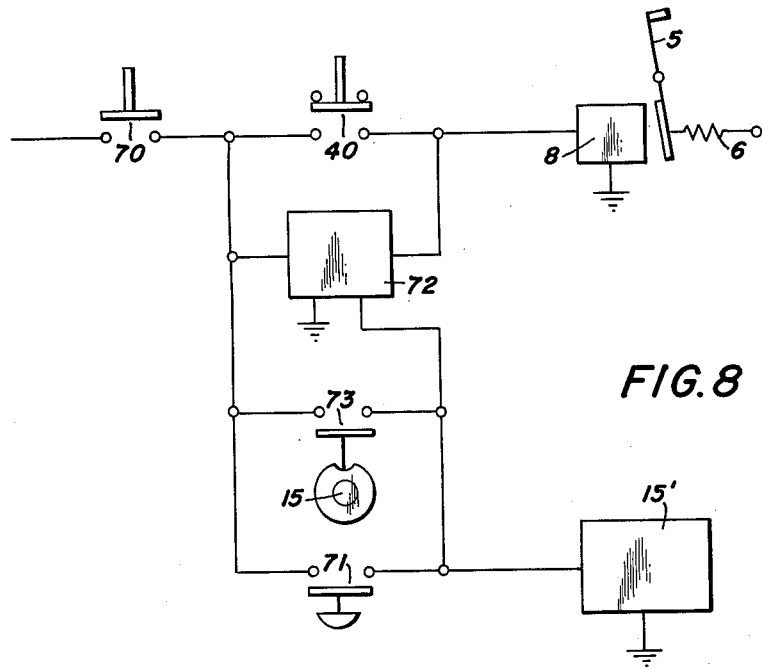
FIG. 8
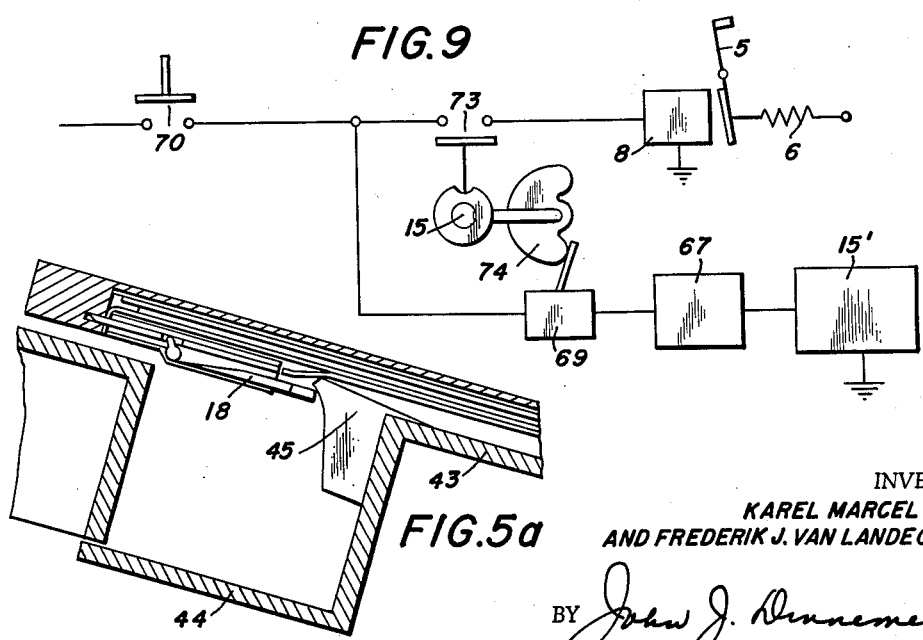
FIG. 9
FIG. 5a
INVENTORS
KAREL MARCEL SANO
AND FREDERIK J. VAN LANDEGHEM
BY *John J. Dennemeyer*
ATTORNEY United States Patent Office 3,105,903
Patented Oct. 1, 1963

3,105,903
APPARATUS FOR UNLOADING FILM SHEET CASSETTES
Karel Marcel Sano, Borsbeek-Antwerp, and Frederik Juliaan Van Landeghem, Mortsel-Antwerp, Belgium, assignors to Gevaert Photo-Producten N.V., Mortsel-Antwerp, Belgium, a Belgian company
Filed July 29, 1960, Ser. No. 46,173
5 Claims. (Cl. 250—66)

This invention relates to apparatus for unloading cassettes for film sheets especially for X-ray film in daylight and more particularly to gripping means incorporated in that type of apparatus to remove the film sheets from the cassette.

Apparatus for transporting X-ray film from a film magazine into a cassette, or for discharging the cassette with the exposed film and transporting the exposed film to a day-light developing apparatus is known in the art. The use of a dark room is thus avoided. In the known apparatus cassettes are used which have a light-proof slit at one side for introducing and withdrawing the film sheets. As the cassette is loaded, a piece of film still projects from the loaded cassette so that a pair of corrugated rollers may remove the film from the cassette after the exposure.

This prior art apparatus can be used only for unloading a special type of cassette. However, it becomes useless when using the type of cassettes in which the film is introduced and taken out by opening a lid which is hinged to one of the cassette walls and in which the film sheet is completely enclosed within the cassette.

The invention hereinafter described relates to apparatus for unloading cassettes for X-ray film in which the cassette is unloaded by means of a gripping mechanism which engages the film sheet at its front portion and takes it out of the cassette. This mechanism consists of a pair of levers provided with jaws which are opened and locked at the end of a downward pivoting motion and which are unlocked and closed at the end of an upward pivoting motion.

To open the jaws the extreme end of one of the levers pushes against a fixed member; the locking is ensured by a pivoting lock member which is connected to one of the levers and which is engaged behind the other lever by means of a hook-shaped extremity. The jaws are closed by means of a spring which pulls them into their closed position and they are unlocked when the lock member abuts a fixed member.

When the apparatus according to the invention is additionally combined with a device for unlocking and opening the cassette and with a device for transporting the film sheet taken out by the gripping device still further an apparatus will be constructed which makes it possible to unload completely automatically a cassette for X-ray film and to take the removed film sheet to a further station, for instance a development station. The only work the operator still has to perform will be that of putting the cassette with the exposed film in the apparatus.

Additional features and advantages of the invention will be understood from a consideration of the following detailed description taken in connection with the accompanying drawings in which several embodiments of the invention have been shown by way of example only, and not as a limitation of the scope of this invention.

In the drawings:

FIG. 5a is an enlarged, fragmentary section of the supporting plate according to FIG. 5.

FIG. 8 is a diagram of the electric circuit for the apparatus according to FIG. 1.

FIG. 9 is a diagram of the electric circuit for the apparatus according to FIG. 5.

Figure 1:
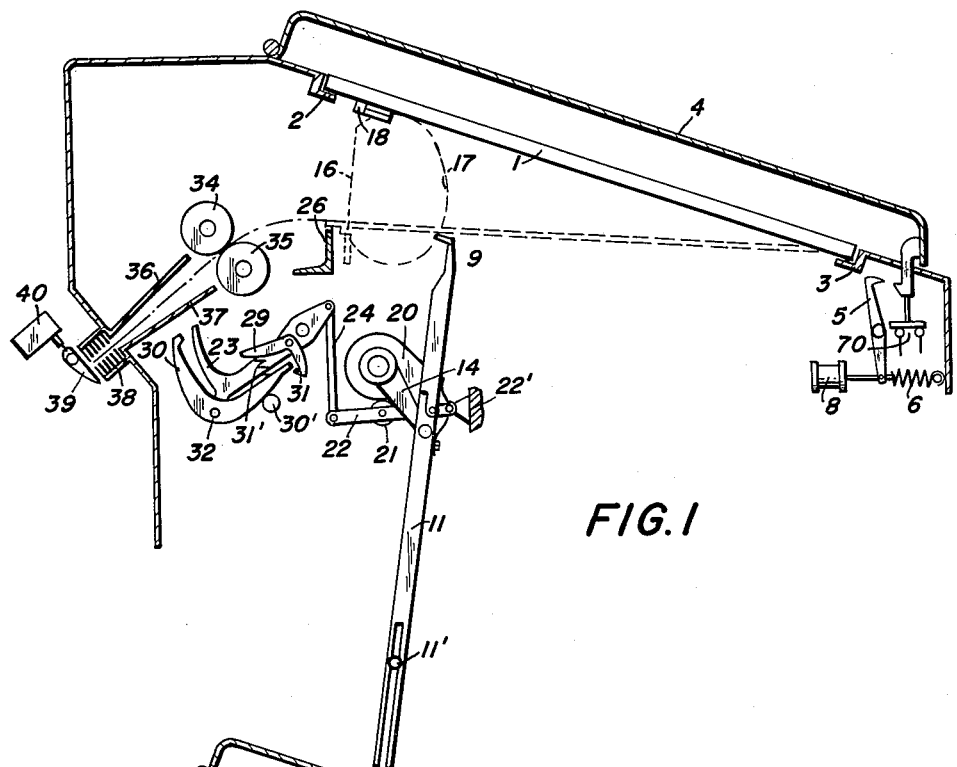
FIG. 1 is a sectional side view of the apparatus according to the invention with the cassette unloading mechanism in the rest position.

Referring now to the embodiment illustrated in FIGURES 1 through 4, there is shown a cassette 1 of rectangular configuration for X-ray film, having its hinged lid 19 facing downwards. The cassette rests with its front and back walls on brackets 2 and 3 of the apparatus. A lid 4 provided with a locking device has a close fit with the apparatus so as to prevent light from entering the interior of the cassette when the lid is in the closed position. As long as the film remains in the apparatus lid 4 is maintained in the closed position by means of a lock member 5 which is operated by a solenoid 8. A spring 6 biases lock member 5 into the locking position.

The cassette lid 19 is provided with two flap locks 18, 18' and bars 11, 12 (FIG. 2) are provided with two complementary hooks 9, 10. A rocking movement of the bars 11, 12, in the manner shown by broken lines 16 and 17, is effected by means of two rocker arms 13, 14, which are mounted on a shaft 15. The hooks 9, 10, engage the flap locks 18, 18' pulling them downwards and unlocking thereby the cassette lid 19 which is also pulled downwards by the same hooks 9, 10 due to the continued rotation of the shaft 15. The lid 19 carrying the film 28 (FIG. 3) rests in the open position on a bracket 26 secured to the frame. Because of the rotation effected by the rocker arms 13, 14 the bars 11, 12 are composed of two pivotally interconnected parts which prevent the hooks 9, 10 from moving excessively forward in response to the rotation of the rocker arms. Portion 16 of the broken line representing the movement of hooks 9, 10 shows almost a straight line because of the fact that the hooks are restrained by locks 18, 18'.

The shaft 15 is driven by a motor 15' through a transmission 15". A driving cam 20 is mounted on shaft 15 and a contact roller 21 rests against cam 20. This contact roller 21 is rotatably connected to a guide arm 22 which pivots on a bracket 22' fixed to the frame. Arm 22 is connected to the gripping mechanism through a connecting bar 24.

Figure 3:
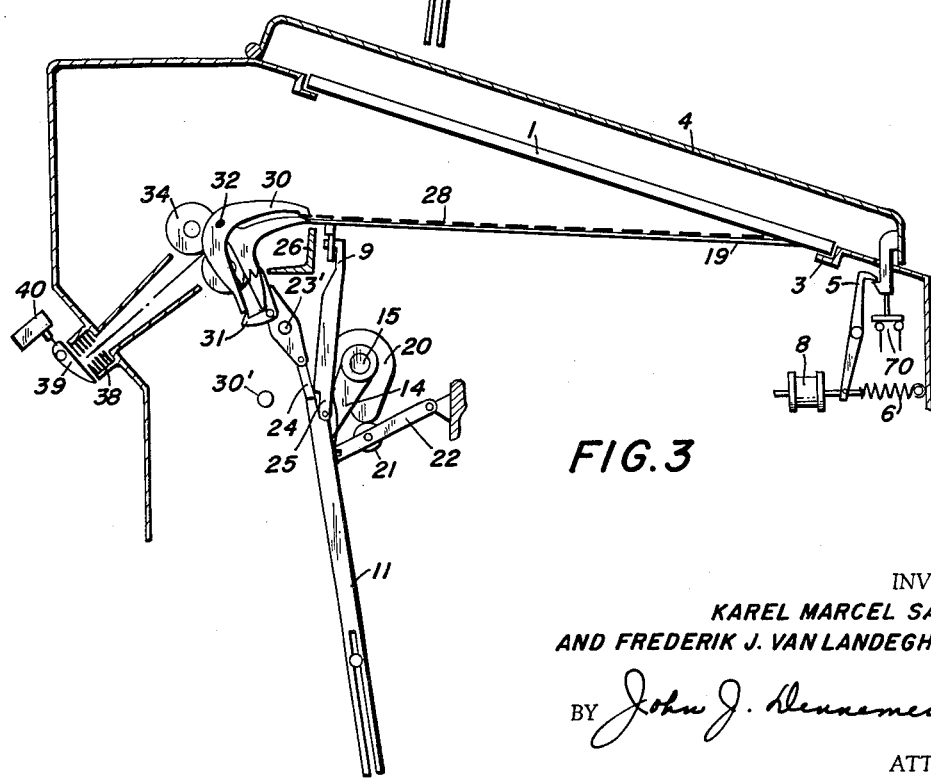
FIG. 3 is a sectional side view of the apparatus according to FIG. 1 with the unloading mechanism in the gripping position.
Figure 7:
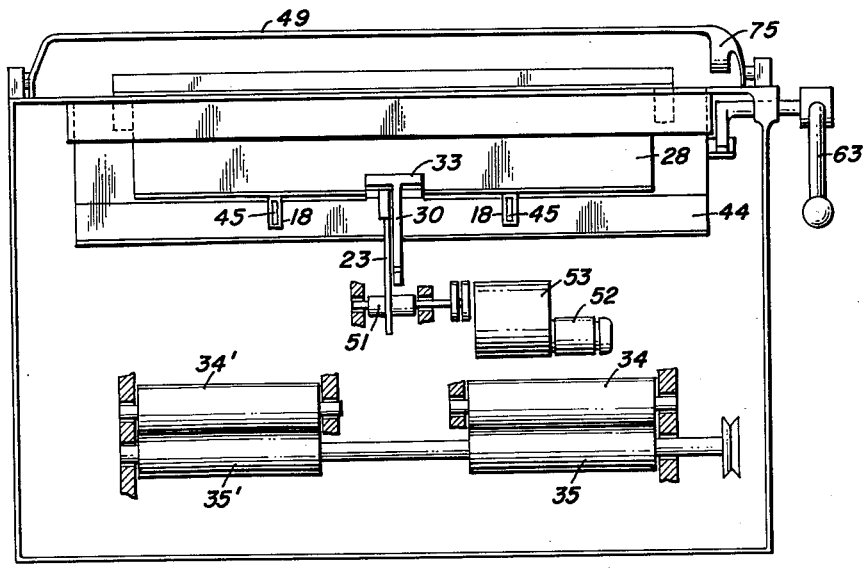
FIG. 7 is a front view of the modification according to FIG. 5.
Figure 2:
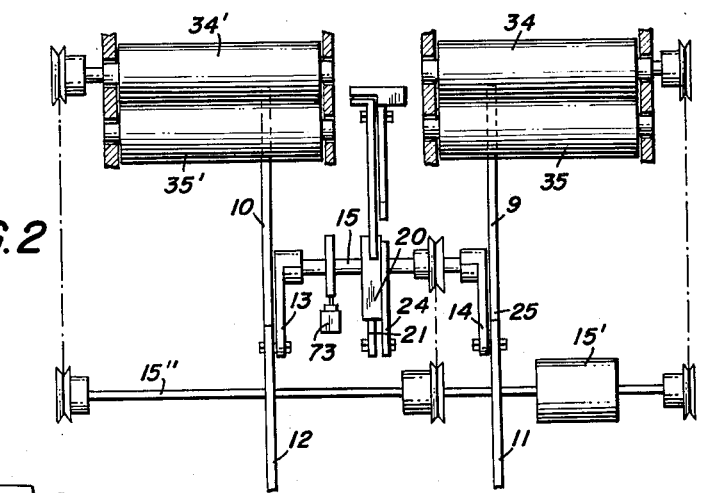
FIG. 2 is a perspective front view of the apparatus of FIG. 1.
Figure 4:
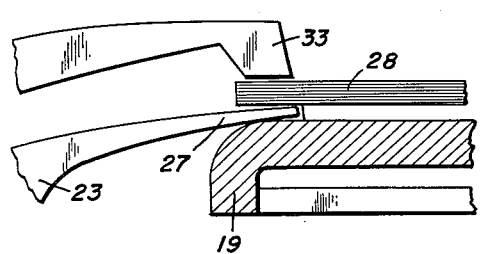
FIG. 4 is an enlarged, fragmentary section of the gripping means engaging the film edge as shown in FIG. 3.
Figure 5:
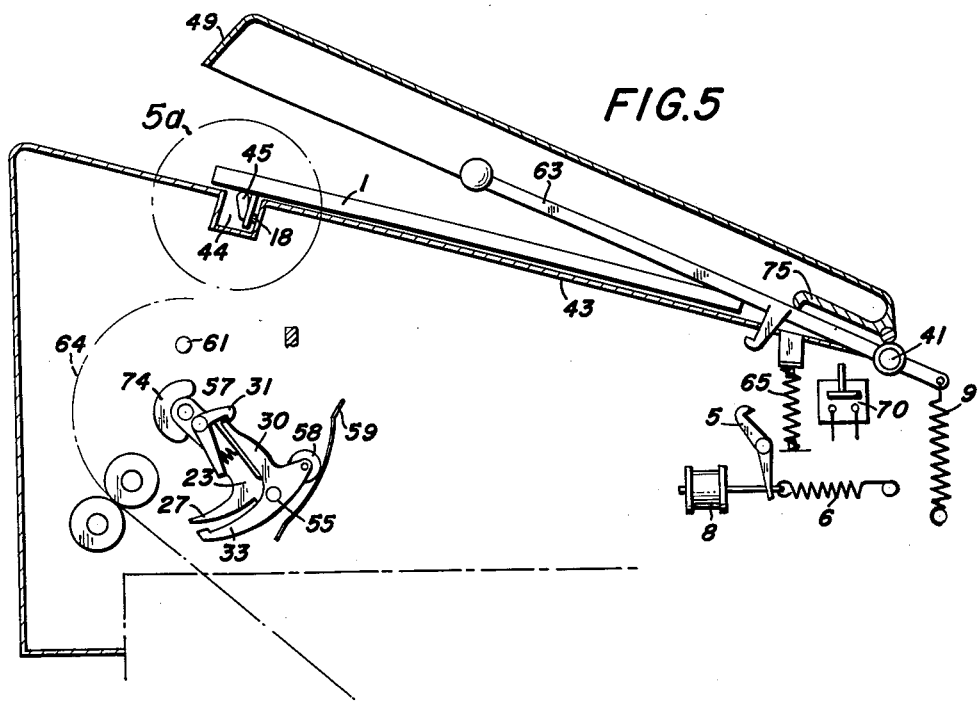
FIG. 5 is a sectional side view of the apparatus according to the invention, with a modified unloading mechanism.

This gripping mechanism mainly consists of two levers 23 and 30 which are pivotally connected to each other at a point 32. The levers are resp. provided with gripping jaws 27, 33. The lever 23 rocks round a point 23' whereby a to and fro motion of the levers 23, 30 is effected through bar 24. The down position is shown in FIGURE 1 while the up position or the gripping position is shown in FIGURES 3 and 4. In the down position the lever 30 is pulled to the open position by means of a fixed member 30' and is locked behind a catch 31 of a locking member 29.

In the up position in which the jaws are to grip the film sheet the lock member 29 abuts against the bracket member 26, whereby the lever 30 is released from the catch 31 and the jaws 27 and 33 of the levers 23 and 30 are closed on the front portion of the film sheet due to the biasing action of a spring member 31' fixed to locking member 29 and to lever 30 (FIG. 4).

In following the rotating motion of the shaft 15 and cam 20 the gripping mechanism holding the film sheet moves downwards introducing thereby the film sheet between rollers 34, 35 and 34', 35' which are also driven by motor 15'. A switch, which is coupled with the shaft 15, disengages the coupling of the gripping mechanism after one rotation of shaft 15. The motor 15' continues to drive the rollers 34, 35 and 34', 35' to discharge the film sheet from the apparatus.

To enable a finishing treatment of the film in another apparatus the rollers 34, 35 resp. 34', 35' guide the film to such an apparatus by means of a passageway 36, 37 which is sealed at 38 against the entry of light and is provided at its outlet with a micro-switch controlled by a flap 39. This flap 39 is lifted by the film sheet as it passes through the passageway 36, 37 thereby switching off the switch 40 whereby a signal is given to indicate that the film sheet is leaving the apparatus. The lid 4 can only be opened after the signal has stopped operating.

It is also possible to provide a coupling between the solenoid of the lid 4 and this signal, so that the lock member 5 remains in the closed position as long as the film sheet has not been completely discharged.

The second example of an arrangement according to the invention shows some simplifications which provide an apparaut of a more economical price as in this arrangement the cassette must be opened manually. The gripping mechanism shows some modification of the mechanism of the first embodiment.

Referring now to FIGURES 5 through 7 and FIG. 9, there is shown an arrangement wherein the corresponding elements of the foregoing embodiment are identified by the same reference numerals.

The modified apparatus is provided with two lids 49 and 43 hinging on a shaft 41. The lid 43 may be closed by means of a lever 63, and the lid 49 is closed thereby due to its own weight as it is supported by means of a member 75 on the lever 63. The front side of the lid 43 is provided with a border 44 in which two pins 45 are mounted which engage flap locks 18, 18' when the cassette 1 is placed on the plate 43 so that the flap locks 18, 18' are opened and the cassette lid 19 is unlocked.

Figure 6:
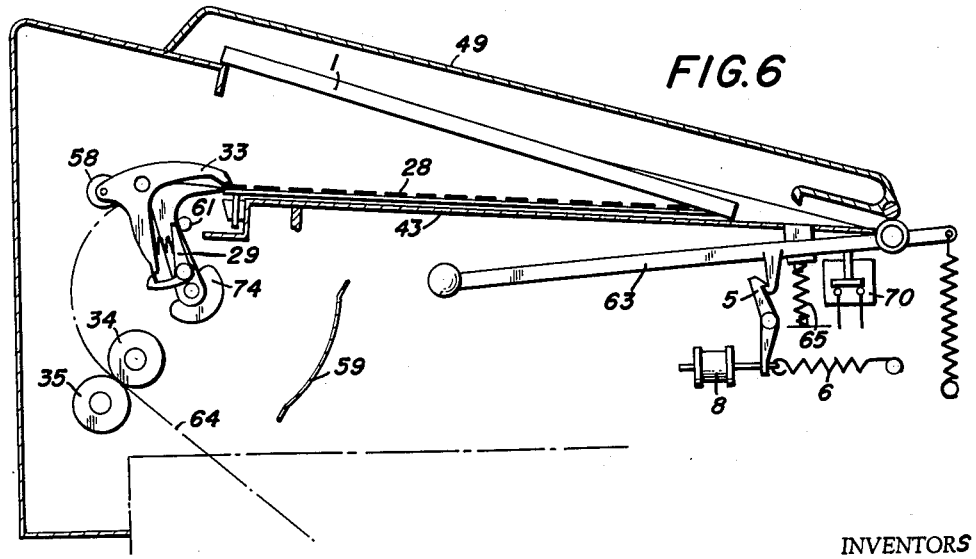
FIG. 6 is a sectional side view of the modification according to FIG. 5 with the unloading mechanism in the gripping position.

When the lever 63 is pushed down, the lid 49 and the lid 43 are brought into the position shown in FIG. 6, the lid 43 engaging a switch 70, to start the motor of the apparatus. A shaft 51 is rotated and the gripping mechanism is moved upwardly.

The gripping mechanism is similar to the corresponding mechanism of the first apparatus. In the position shown in FIG. 5 the gripping levers 23, 30 are opened by means of a contact roller 58 which is guided along a wall 59 so that the catch 31 of the lock member 29 is engaged behind the lever 30. As shown in FIGURE 6 the gripping levers 23, 30 remain open until the lock member 29 abuts a stud 61 whereby the gripping levers are closed on the front portion of the film sheet.

In the same manner already explained in the foregoing example the film sheet is pushed between the rollers 34, 35 and 34', 35' which are rotated to discharge the film into a developing apparatus. FIGURE 8 shows an electric circuit which is designed for the apparatus described in the first embodiment. When lid 4 is lowered into the closed position a first electrical contact 70 is closed in this circuit, so that the cassette cannot be unloaded until the apparatus is sealed off in a completely light proof manner. The motor 15' is started by means of a push button contact 71.

Current flows to a timing switch 72 which energizes the solenoid 8 to lock the lid 4. This timing switch energizes the solenoid 8 for a predetermined period of time which allows the film to be unloaded and discharged from the apparatus whereby the flap 39 outside passageway 36, 37 (FIG. 1) energizes the switch contact 40. This switch contact is in parallel with the contact of the timing switch 72 so that the lock member 5 is released only after the complete removal of the film from the apparatus. The rotating cam shaft 15 closes the switch 73 and keeps the circuit of contact 71 closed, to allow the cam shaft 15 to perform one complete revolution.

The electric circuit of the modified arrangement is shown in FIGURE 9. As lever 63 is lowered and lid 4 is closed the contact 70 is closed. The current flows to switch 69 and reversible switch 67 which controls the operation of motor 15'.

The switch 69 is shown in the position, in which the motor is energized to rotate to the right so that the cam shaft 15 and the cam 74 are rotated in a clockwise direction. The contact 73 is closed at a predetermined interval after the starting of the motor, energizing thereby the solenoid 8 which causes the locking of the lever 63. The clockwise motion of the cam 74 is continued until the switch 69 is reversed. A new impulse is set from switch 69 to switch 67 and the direction of the motor is changed from a clockwise to a counter-clockwise direction so that shaft 15 and cam 7 turn in a counter-clockwise direction. Finally, the cam 74 changes again the direction of the motor to the clockwise direction by resetting the switch 69 and at this time the contact 73 interrupts the current and the solenoid 8 is de-energized, so that the layer 63 is released to open the contact 70 whereupon the current for the apparatus is cut off.

The arrangement of this apparatus makes possible the use of an apparatus wherein the film sheet is completely automatically treated after exposure, delivering a developed and dried film sheet.

The appropriate cassette to be used in the apparatus according to the invention can be loaded by automatic means, and a suitable apparatus of this type has been described for example in application Serial No. 4,694, filed January 26, 1960, now U.S. Patent No. 3,075,080, granted January 22, 1963.

We claim:

1. Apparatus for unloading a cassette wherein the cassette lid is opened and the film is withdrawn from the cassette and discharged from the apparatus, comprising in combination an apparatus lid for closing said apparatus in a lightproof manner, means for supporting said cassette within said apparatus, means for locking said apparatus lid, shaft means, cam means mounted on said shaft means, a guide arm, a contact roller mounted on said guide arm and engaging said cam means, lever means for engaging said film sheet in said cassette and connected to said guide arm, slide means, hook means connected to said slide means, rocker means connecting said slide means to said shaft means, a film discharge opening in said apparatus, transporting means for conducting said film sheet through said discharge opening, driving means connected to said shaft means, said driving means actuating said hook means to open said cassette lid and said lever means to withdraw said film sheet and deposit it on said transporting means, and means responsive to the discharge of said film sheet to unlock said apparatus lid.

2. Apparatus for unloading a cassette wherein the cassette lid is opened and the film is withdrawn from the cassette and discharged from the apparatus, comprising in combination an apparatus lid for closing said apparatus in a light-proof manner, support means for said cassette, locking means for said apparatus lid, a shaft, a driving cam mounted on said shaft, a support bracket, a guide arm pivotally connected to said support bracket, a contact roller mounted on said guide arm and engaging said driving cam, a pair of gripping levers pivotally mounted in said apparatus, a connecting member between said levers and said guide arm, a pair of slide members, a pair of hook members pivotally mounted on said slide members, a pair of rocking arms connecting said slide members to said shaft, driving means connected to said shaft, a film discharge opening in said apparatus, driving rollers for discharging said film sheet through said opening and switch means responsive to the discharge of said film sheet for unlocking said apparatus lid.

3. Apparatus for unloading a cassette wherein the cassette lid is opened and the film is withdrawn from the cassette and discharged from the apparatus, comprising in combination an apparatus lid for closing said apparatus in a light-proof manner, support means for said cassette, locking means for said apparatus lid, a shaft, a driving cam mounted on said shaft, a support bracket, a guide arm pivotally connected to said support bracket, a contact roller mounted on said guide arm and engaging said driving cam, a first gripping lever pivotally mounted in said apparatus, a second gripping lever pivotally mounted on said first lever, spring means for biasing said second lever toward said first lever, a locking member for locking said second lever away from said first lever, abutment means for locking and unlocking said second lever, a connecting bar between said first lever and said guide arm, a pair of slide bars, a pair of hooks pivotally connected to said slide bars, a pair of rocking arms connecting said slide bars and said shaft, a motor connected to said shaft, means for energizing said motor, a film discharge opening in said apparatus, transporting rollers driven by said motor to conduct said film sheet through said discharge opening, first switch means at said discharge opening responsive to the discharge of said film sheet to unlock said apparatus lid, and second switch means operated by means connected to said shaft for energizing said motor to rotate said shaft a full revolution.

4. Apparatus for unloading a cassette wherein the cassette lid is opened and the film is withdrawn from the cassette and discharged from the apparatus, comprising in combination an apparatus lid for closing said apparatus is a light-proof manner, support means for said cassette on said apparatus lid, locking means for said apparatus lid, a lever for opening and closing said apparatus lid, means on said apparatus lid for supporting said cassette, a shaft, a first lever connected to said shaft, a second lever connected to said first lever, means for biasing said second lever toward said first lever, locking means for locking said second lever away from said first lever, said first and second levers being adapted and arranged to grip said film sheet at one edge only means for locking and unlocking said second lever, driving means for said shaft, means for transporting said film sheet through said discharge opening, and means for controlling said driving means to rotate said shaft one full revolution.

5. Apparatus for unloading a cassette wherein the cassette lid is opened and the film is withdrawn from the cassette and discharged from the apparatus, comprising in combination an apparatus lid for closing said apparatus in a light-proof manner, support means for said cassette on said apparatus lid, locking means for said apparatus lid, a lever for opening and closing said apparatus lid, means on said apparatus lid for supporting said cassette, a shaft, a first lever connected to said shaft, a second lever connected to said first lever, means for biasing said second lever toward said first lever, said first and second levers being adapted and arranged to grip said film at one edge only, locking means for locking said second lever away from said first lever, means for locking and unlocking said second lever, a reversible motor for driving said shaft, switch means for controlling the energization of said motor and cam means on said shaft for actuating said switch means and unlock said apparatus lid.

References Cited in the file of this patent

UNITED STATES PATENTS

| | | |
|---|---|---|
| 2,239,219 | Carl | Apr. 22, 1941 |
| 2,668,913 | Goldfield et al. | Feb. 9, 1954 |
| 2,815,451 | Heimerich | Dec. 3, 1957 |
| 2,878,389 | Raffman | Mar. 17, 1959 |
| 2,925,766 | Sandgren | Feb. 23, 1960 |